United States Patent [19]

Speth

[11] Patent Number: 4,553,283

[45] Date of Patent: Nov. 19, 1985

[54] WINDSHIELD WIPER ADAPTER

[76] Inventor: Peter J. Speth, 239-25 88th Ave., Bellerose, N.Y. 11426

[21] Appl. No.: 705,772

[22] Filed: Feb. 26, 1985

[51] Int. Cl.[4] .............................. B60S 1/28; B60S 1/40
[52] U.S. Cl. ............................... 15/250.32; 15/250.41; 15/250.42
[58] Field of Search .................... 15/250.32–250.42

[56] References Cited

U.S. PATENT DOCUMENTS

| | | | | |
|---|---|---|---|---|
| 1,938,840 | 12/1933 | Kleven | ........................ | 15/250.41 X |
| 2,025,888 | 12/1935 | Olivero | ........................ | 15/250.40 X |
| 3,238,555 | 3/1966 | Cels | ........................ | 15/250.40 X |
| 3,874,019 | 4/1975 | Speth | ........................ | 15/250.41 X |
| 4,287,634 | 9/1981 | Speth | ........................ | 15/250.33 X |

Primary Examiner—Peter Feldman
Attorney, Agent, or Firm—Blum Kaplan Friedman Silberman & Beran

[57] ABSTRACT

A two-bladed windshield wiper adapter which tilts the wiper blades in the sweep movement direction. The adapter is formed with a plug receiving portion loosely fitted to a cross plate having two plug members disposed perpendicular thereto for receiving the wiper blades. The adapter has the ability to pivot and tilt at the position where the plug receiving portion is coupled to the cross plate.

4 Claims, 4 Drawing Figures

WINDSHIELD WIPER ADAPTER

BACKGROUND OF THE INVENTION

The present invention relates generally to a windshield wiper adapter and, in particular, to a windshield wiper adapter which provides improved wiping performance of a windshield by utilizing two parallel wiper blades on a single wiper driving arm.

The general provision of two parallel windshield wiper blades secured on a single windshield wiper driving arm is the subject of my earlier U.S. Pat. No. 3,874,019, which issued on Apr. 1, 1975, the disclosure of which is incorporated by reference herein as though fully set forth. This patent is directed to a windshield wiper adapter which allows arm pressure to be divided equally between two wiper blades to maintain sufficient blade-to-windshield contact for assuring effective wiping action. Other patents directed to windshield wiper blade assemblies which have two wiper blades include U.S. Pat. Nos. 1,938,840, 2,605,941 and 2,607,944.

Nevertheless, the prior art wiper blade assemblies have the disadvantage that such windshield wiper two-blade adapters are not designed for positive blade tilting in order to promote clear sweep wiping. Accordingly, it is desired to provide an improved two-bladed windshield wiper adapter designed for positive blade tilting to improve wiping action and prevent lifting of the blades.

SUMMARY OF THE INVENTION

Generally speaking, in accordance with the present invention, an adapter for supporting two wiper blades on a windshield wiper drive arm is provided. The adapter includes a cross plate and a pair of posts carried by the cross plate on which the two wiper blades are pivotally mounted. A plug member which couples the adapter to the windshield wiper drive arm is loosely fitted to the cross plate to permit free pivoting and tilting of the adapter.

The two-blade adapter allows each blade to operate independently for both up and down movement and enables substantial equal wiper pressure on each blade regardless of the position of the blades on the windshield. The two-blade adapter tilts the entire blade assembly. When the blades stop at the end of a sweep, the wiper arm pressure will hold the blades while reversing arm movement will tilt the adapter due to a single pivot at the arm connecting point. Once the blades are tilted in the sweep movement direction, the moving arm pressure will keep the blades tilted until reversing arm movement changes the tilt again.

Accordingly, it is an object of the present invention to provide an improved windshield wiper adapter.

Another object of the present invention is to provide an improved two-bladed windshield wiper adapter designed for positive blade tilting.

Still a further object of the present invention is to provide an improved two-bladed windshield wiper adapter which tilts the wiper blades in the sweep movement direction.

Still another object of the present invention is to provide an improved two-bladed windshield wiper adapter which allows each blade to operate independently for both up and down movement.

It is still a further object of the present invention to provide an improved two-bladed windshield wiper adapter which enables substantial equal wiper pressure on each blade regardless of position of the blades on the windshield.

It is yet another object of the present invention to provide an improved two-blade windshield wiper adapter which prevents the leading blade in either sweep movement direction from lifting its mating blade away from windshield contact.

Yet a further object of the present invention is to provide an improved two-bladed windshield wiper adapter having a single pivot at the arm connecting point for tilting the blades in the sweep movement direction.

Still other objects and advantages of the present invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 2:
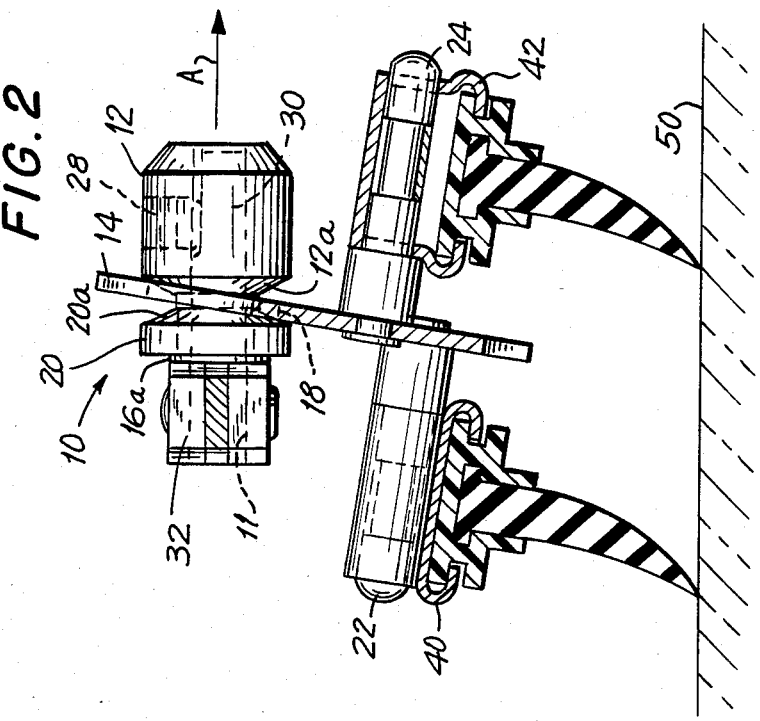
FIG. 2 is an enlarged sectional view taken along line 2—2 of FIG. 1.

Referring to the drawings, a windshield wiper two-blade adapter, generally indicated at 10, and constructed in accordance with a preferred embodiment of the present invention includes a plug receiving member 12 loosely fitted in a cross plate 14 by means of a plug receiving section 16 of member 12 being inserted in an aperture 18 of plate 14. Plug receiving member 12 and plug receiving section 16 are formed with an aligned cylindrical opening 11 therein for receiving a plug 30 of a wiper arm 32. Aperture 18 has a diameter greater than that of plug section 16 thereby enabling cross plate 14 to pivot and tilt at the position where plug receiving portion 12 is attached to cross plate 14. A collar 20 is fixed around plug section 16, for example, by crimping end end 16a of section 16 after plug section 16 is inserted through aperture 18 and collar 20, thus securing plug receiving portion 12 to cross plate 14.

Cross plate 14 includes posts 22 and 24 disposed essentially perpendicular to cross plate 15 and mounted at opposite ends and on opposite sides thereof for receiving wiper blades 40 and 42, respectively. Plug receiving portion 12 includes a threaded opening 25 in its side surface and a set screw 28 threaded therein. Set screw 28 releaseably locks plug 30 in plug member 12.

Figure 1:
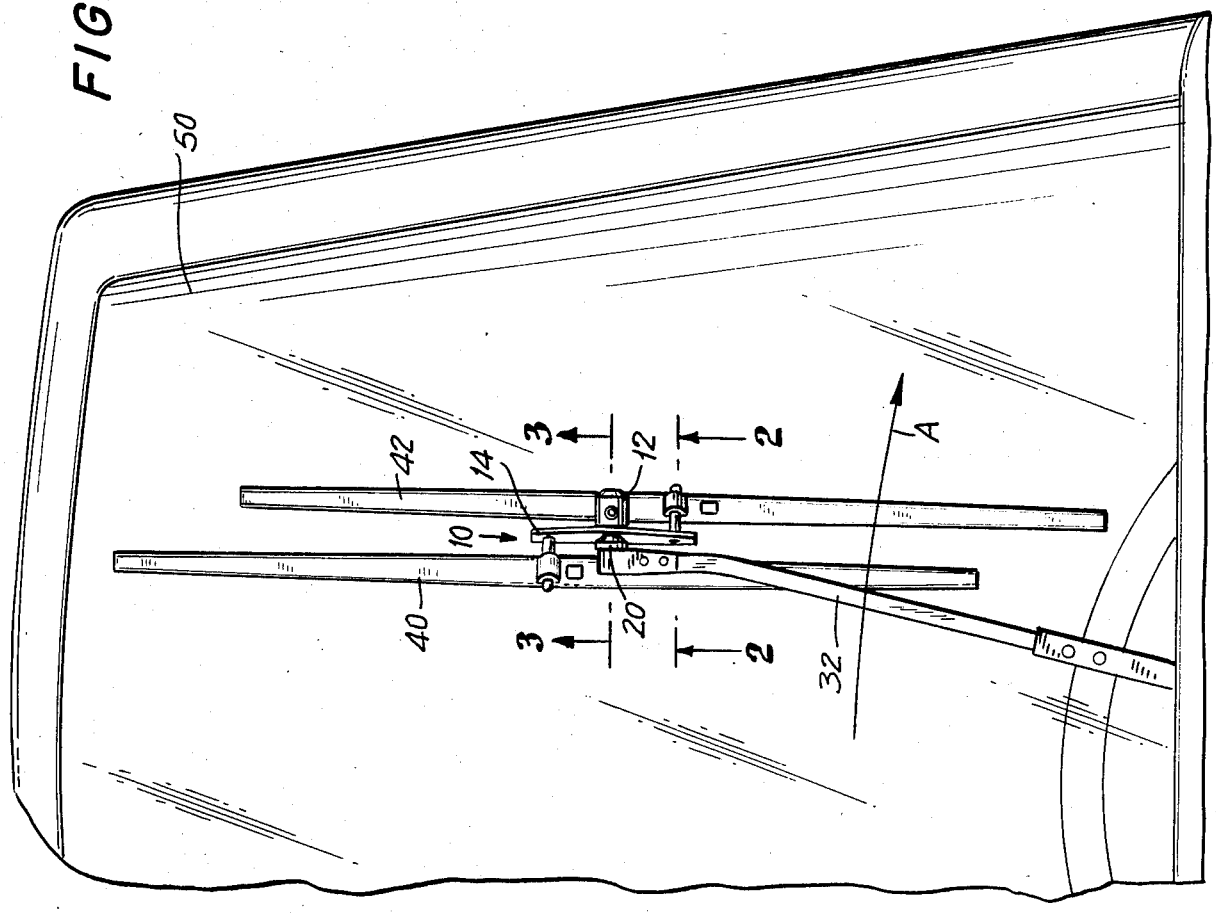
FIG. 1 is a partial front view of an automobile windshield including a windshield wiper adapter constructed in accordance with a preferred embodiment of the present invention.
Figure 4:
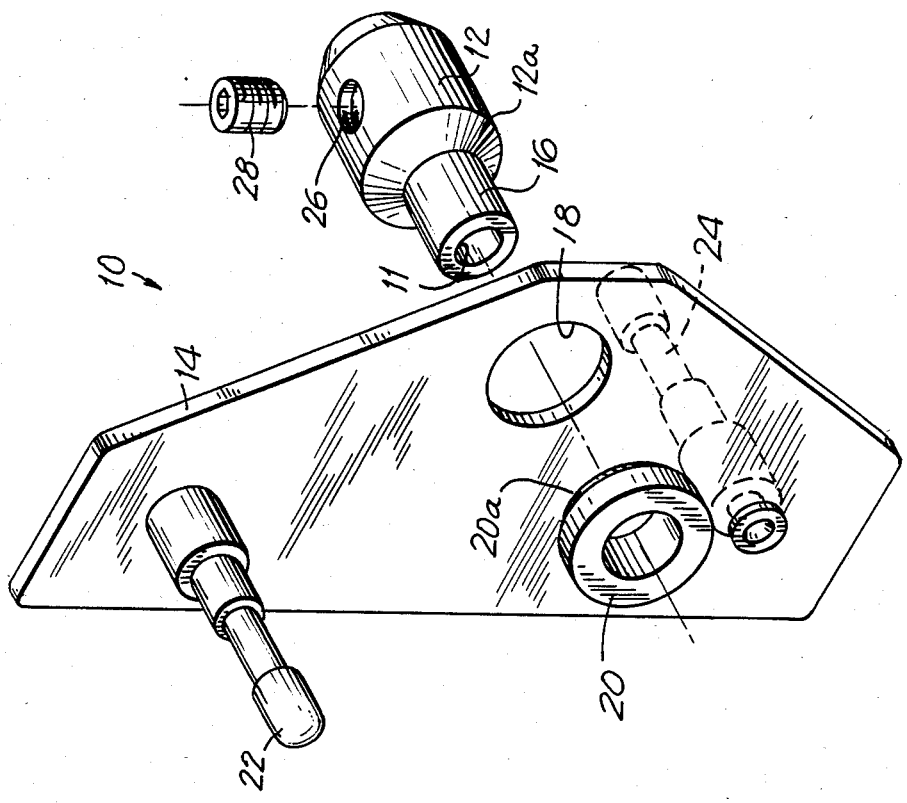
FIG. 4 is an exploded view of the windshield wiper adapter of the present invention depicted in FIG. 1.
Figure 3:
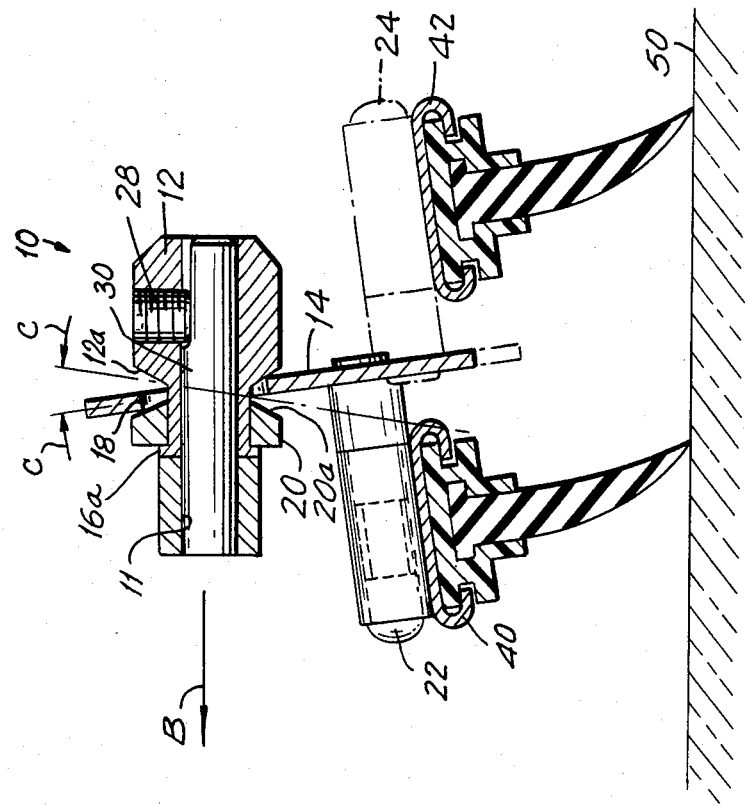
FIG. 3 is an enlarged sectional view taken along line 3—3 of FIG. 1 but showing the adapter traveling in an opposite direction.

FIG. 1 shows wiper blades 40 and 42 positioned on an automobile windshield 50. The assembly includes two standard windshield wipers mounted to a wiper arm 32 by adapter 10. In operation, arm 32 moves wiper blades 40 and 42 across windshield 50 in a sweeping back and forth motion by means of adapter 10. In FIG. 1, arm 32 is moving in the direction of arrow A. FIGS. 2 and 3 better illustrate the pivot arrangement of cross plate 14 and plug receiving portion 12. As wiper blades 40 and 42 are swept across the windshield, adapter 10 allows the blades to tilt and pivot during wiping due to the loose fit of plug receiving member 12 to plate 14.

Surface 12a of plug receiving portion 12 defines a truncated conical surface. Similarly, end 20a of collar 20 defines a truncated conical surface. As best depicted in FIGS. 2 and 3, when collar 20 is fixed to cylindrical section 16 of plug receiving portion 12, the gap provided therebetween permits pivoting and tilting of cross plate 14 with respect to plug 30 thereby permitting positive wiper action of both wiper blades. The area of tilting is shown between arrows C in FIG. 3. FIG. 2 depicts adapter 10 moving to the right in the direction of arrow A with cross piece 14 tilted in a first direction. On the other hand, FIG. 3 shows adapter 10 moving in the opposite direction of arrow B whereby cross plate 14 has tilted in the opposite direction.

As disclosed, a particular benefit of the adapter of the present invention is the ability, when used in conjunction with a two-blade wiper apparatus, for positive blade tilting during wiping. Such positive blade tilting is due to arm movement and arm pressure alone. This feature contrasts with existing systems that depend on windshield surface resistance which varies from car to car.

Additionally, the adapter has other desirable features. Arm pressure is equally divided between the two wiper blades in order to maintain sufficient blade-to-windshield contact, thus assuring effective wiping action. Also, the leading blade in either sweep movement direction does not lift its mating blade away from the windshield surface during wiping action.

It will thus be seen that the objects set forth above, among those made apparent from the preceding description, are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also understood that the following claims are intended to cover the generic and specific features of the invention herein described and all statements of the scope of the invention which, as a matter of language, might be said to fall therebetween.

What is claimed is:

1. An adapter for supporting two wiper blades on a reciprocating windshield wiper drive arm comprising a cross plate having first and second posts extending essentially perpendicular therefrom for independently pivotally supporting said two wiper blades, respectively, said cross plate having an opening therein intermediate said first and second posts, and a plug member fitted in said opening for rotational and tilting movement for coupling said adapter to said drive arm, said plug member including a gap defined by opposing walls of said plug member, said opening in said cross piece being situated in said gap of said plug member, the configuration of said gap restricting the tilt of said cross plate to insure that the surfaces of said two wiper blades remain on said windshield during reciprocation of said drive arm.

2. The adapter as claimed in claim 1, wherein said gap is slightly wider than the thickness of said cross plate.

3. The adapter as claimed in claim 2, wherein the opposing walls defining said gap are truncated conical surfaces opening away from said cross plate.

4. The adapter as claimed in claim 3, wherein said first and second posts extend in opposite directions from said cross plate.

* * * * *